US010298771B1

(12) United States Patent
Yamakawa et al.

(10) Patent No.: US 10,298,771 B1
(45) Date of Patent: May 21, 2019

(54) INTERCOM SYSTEM

(71) Applicant: AIPHONE CO., LTD., Nagoya-shi, Aichi (JP)

(72) Inventors: Seiya Yamakawa, Nagoya (JP); Akira Kai, Nagoya (JP); Yuuta Shimomura, Nagoya (JP)

(73) Assignee: AIPHONE CO., LTD., Nagoya-Shi, Aichi (JP)

( * ) Notice: Subject to any disclaimer, the term of this patent is extended or adjusted under 35 U.S.C. 154(b) by 0 days.

(21) Appl. No.: 16/089,336

(22) PCT Filed: Mar. 28, 2016

(86) PCT No.: PCT/JP2016/059816
§ 371 (c)(1),
(2) Date: Sep. 27, 2018

(87) PCT Pub. No.: WO2017/168490
PCT Pub. Date: Oct. 5, 2017

(51) Int. Cl.
*H04M 1/60* (2006.01)
*H04M 9/00* (2006.01)
*H04M 11/02* (2006.01)

(52) U.S. Cl.
CPC ......... *H04M 9/001* (2013.01); *H04M 11/025* (2013.01)

(58) Field of Classification Search
USPC .................................................... 379/167.01
See application file for complete search history.

(56) References Cited

U.S. PATENT DOCUMENTS 5,612,994 A * 3/1997 Chen ...................... H04N 7/186 348/14.01
6,058,174 A * 5/2000 Borshchevsky .... H04M 1/0291 379/167.02

(Continued)

FOREIGN PATENT DOCUMENTS

JP 2004-260679 A 9/2004
JP 2006-238201 A 9/2006

(Continued)

OTHER PUBLICATIONS

International Search Report and Written Opinion for related International Application No. PCT/JP2016/059816, dated Jun. 14, 2016; English translation of ISR provided; 6 pages.

*Primary Examiner* — Quoc D Tran
(74) *Attorney, Agent, or Firm* — Procopio, Cory, Hargreaves & Savitch LLP

(57) ABSTRACT

Each of a plurality of dwelling buildings includes a dwelling parent device, a management office parent device, and a building control unit communicatively connected to each dwelling parent device in the host building and the management office parent device in the host building via an intercom line. The building control units are interconnected via a network that is connected with a management center that includes a centralized management office parent device and a centralized control unit connected to the centralized management office parent device via the intercom line. The building control unit in each dwelling building can set a calling time zone in which it is possible to call the centralized management office parent device or the management office parent device of other building, in addition to the management office parent device in the host building. When there is a calling from the dwelling parent device in the set calling time zone, the management office parent device in the host building receives a calling signal from the dwelling (Continued)

parent device and the building control unit also receives the calling signal from the dwelling parent device and transmits the calling signal to the centralized management office parent device or the management office parent device of the other building.

4 Claims, 6 Drawing Sheets

(56) References Cited

U.S. PATENT DOCUMENTS

| | | | | |
|---|---|---|---|---|
| 7,764,775 | B2 * | 7/2010 | Tarkoff | H04M 11/025 379/167.02 |
| 2006/0056386 | A1 * | 3/2006 | Stogel | H04L 29/06027 370/351 |
| 2014/0219431 | A1 * | 8/2014 | Wagner | H04M 11/025 379/167.02 |
| 2017/0187479 | A1 * | 6/2017 | Yamamoto | H04J 3/0638 |
| 2017/0214802 | A1 * | 7/2017 | Gaspard | H04M 11/025 |
| 2018/0027124 | A1 * | 1/2018 | Maruyama | H04M 9/00 379/167.02 |

FOREIGN PATENT DOCUMENTS

| | | |
|---|---|---|
| JP | 2010-118011 A | 5/2010 |
| JP | 2012-182546 A | 9/2012 |

* cited by examiner

*Fig.3*

| DWELLING BUILDING A CALLING TABLE TA | | | | | | |
|---|---|---|---|---|---|---|
| MANAGEMENT OFFICE CALLING | CENTRALIZED MANAGEMENT OFFICE PARENT DEVICE | | MANAGEMENT OFFICE PARENT DEVICE | | | |
| | MANAGEMENT CENTER F | MANAGEMENT CENTER G | BUILDING B | BUILDING C | BUILDING D | BUILDING E |
| CALLING TIME 1 17:00~09:00 | ○ | ○ | ○ | × | × | × |
| CALLING TIME 2 12:00~13:00 | ○ | × | ○ | ○ | ○ | × |

INTERCOM SYSTEM

CROSS-REFERENCE TO RELATED APPLICATIONS

This application is a U.S. National Stage entry of PCT Application No: PCT/JP2016/059816 filed on Mar. 28, 2016, the contents of which are incorporated herein by reference.

TECHNICAL FIELD

The present invention relates to an intercom system that is to be used in a housing complex.

RELATED ART

In the related art, an intercom system for a housing complex constituted by a plurality of dwelling buildings has been known. In the intercom system, each of the dwelling buildings is connected to a controller by way of an intercom line (an intercom dedicated line).

CITATION LIST

Patent Documents

Patent Document 1: JP-A-2004-260679

SUMMARY OF THE INVENTION

Problems to be Solved by the Invention

When introducing the intercom system for the housing complex constituted by the plurality of dwelling buildings, a centralized controller configured to control the plurality of buildings in a centralized manner is installed in a centralized control building for centralized management of the intercom system. In addition to a management office parent device installed in a management office of each dwelling building, a centralized management office parent device configured to manage control of the centralized controller is installed in the centralized control building having the centralized controller installed therein. In the related art, when the management office parent device of each dwelling building is called from a dwelling parent device, if there is no manager in the management office, it is not possible to respond to the calling from the dwelling parent device.

It is therefore an object of the present invention to provide an intercom system capable of responding to a calling with the other management office parent device when it is not possible to respond to the calling with a management office parent device of each dwelling building.

Means for Solving the Problems

In order to achieve the above object, an intercom system of the present invention is an intercom system that is to be used in a housing complex constituted by a plurality of dwelling buildings, wherein each of the dwelling buildings includes:

a dwelling parent device installed in each dwelling, a management office parent device in a host building communicatively connected to the dwelling parent device via an intercom line and capable of responding to a calling from the dwelling parent device, and a building control unit communicatively connected to the dwelling parent device of each dwelling in the host building and the management office parent device in the host building via the intercom line, wherein the building control units of the plurality of dwelling buildings are interconnected via a network on which communication is to be performed in accordance with a general-purpose protocol, wherein the network is further connected with a centralized building, and the centralized building includes a centralized management office parent device capable of making a phone call to the dwelling parent device in each dwelling of the plurality of dwelling buildings, and a centralized control unit communicatively connected to the centralized management office parent device via the intercom line, wherein the building control unit in each dwelling building can set a specific calling time zone in which it is possible to call the centralized management office parent device or the management office parent device of other building, in addition to the management office parent device in the host building, and wherein when there is a calling from the dwelling parent device in the set calling time zone, the management office parent device in the host building receives a calling signal from the dwelling parent device and the building control unit also receives the calling signal from the dwelling parent device and transmits the calling signal to the centralized management office parent device or the management office parent device of the other building.

According to the above configuration, the setting for calling the centralized management office parent device or the management office parent device of the different dwelling building is made by the control of the building control unit in the time zone in which it is not possible to respond to a calling with the management office parent device in the host building. Therefore, it is possible to securely respond to the calling from the dwelling parent device.

Also, in the intercom system of the present invention, each building control unit may include a storage in which a calling table, in which each dwelling parent device in the host building and at least one centralized management office parent device or management office parent device of the other building capable of being called from the corresponding dwelling parent device are associated with each other, is stored, and a setting of the calling table may be changed by a setting unit capable of performing communication with each building control unit.

According to the above configuration, since the building control unit of each dwelling building stores therein the calling table for calling the centralized management office parent device or the management office parent device of the other building from the dwelling parent device in the host building, it is possible to lower a processing capacity necessary for the centralized control unit, so that it is possible to suppress an increase in cost. Also, it is possible to easily change the setting of the calling table by the setting unit connected to each building control unit.

Also, in the intercom system of the present invention, the calling time zone can be set in plural in the calling table.

According to the above configuration, it is possible to prepare a variety of calling patterns by a combination of the different calling time zones, in correspondence to a situation of each dwelling building.

Also, in the intercom system of the present invention, the calling table stored in the building control unit of the other building may be set over the network by the setting unit communicatively connected to the building control unit in the host building.

According to the above configuration, since it is possible to set the calling tables of all the dwelling buildings by the setting unit connected to the building control unit of one dwelling building, it is possible to largely improve the operation efficiency.

Effects of the Invention

According to the intercom system of the present invention, when it is not possible to respond to the calling with the management office parent device of each dwelling building, it is possible to respond to the calling with the other management office parent device.

BRIEF DESCRIPTION OF THE DRAWINGS

FIG. 3 depicts an example of a calling table stored in the building control unit.

DETAILED DESCRIPTION OF ILLUSTRATIVE EMBODIMENT

Hereinafter, an example of an illustrative embodiment will be described with reference to the drawings.

Figure 1:
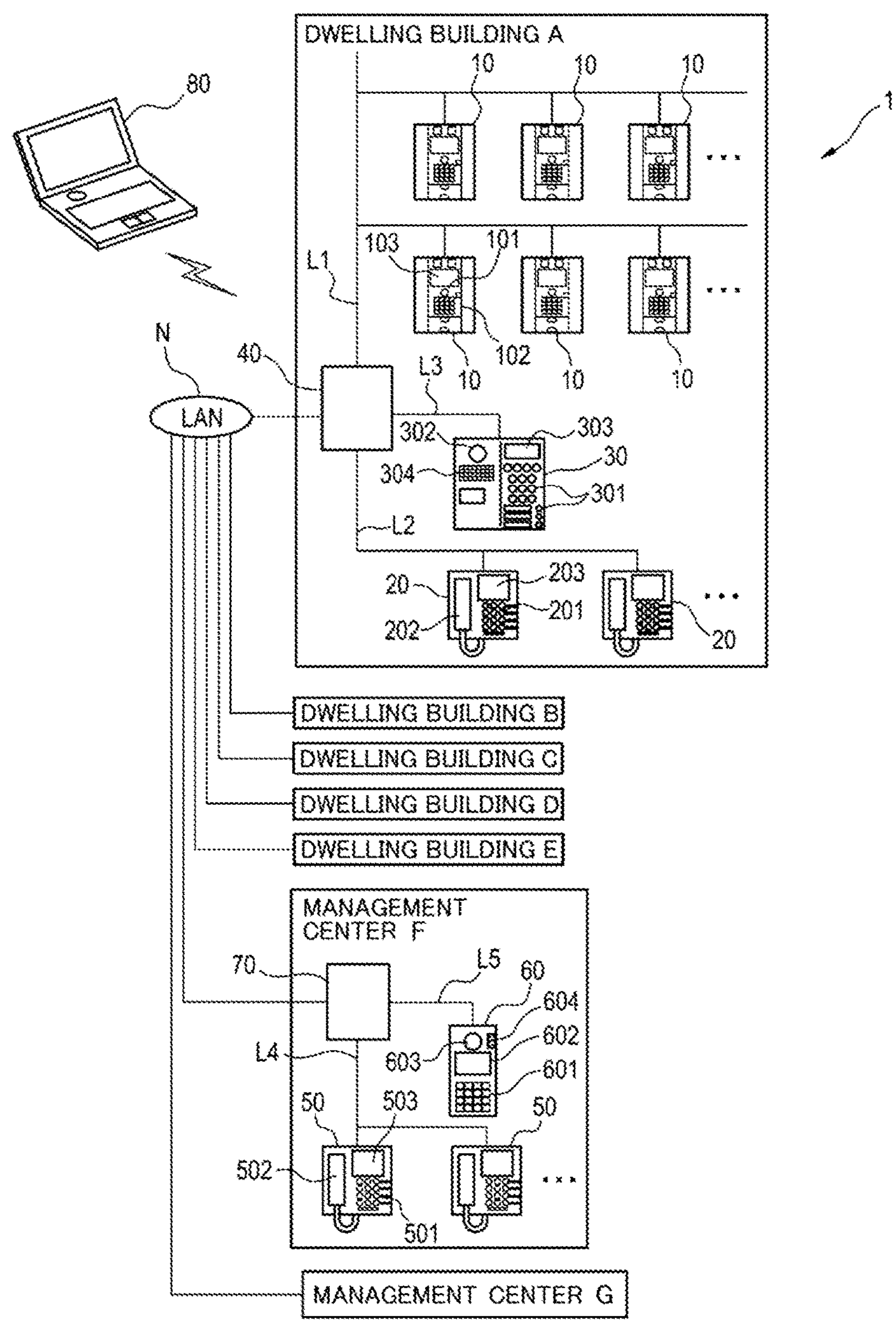
FIG. 1 is a configuration view of an intercom system in accordance with an illustrative embodiment of the present invention.

As shown in FIG. 1, an intercom system 1 is a system that is used in a housing complex such as a condominium building constituted by a plurality of dwelling buildings (in the example, a dwelling building A to a dwelling building E). The intercom system 1 includes dwelling parent devices 10, management office parent devices 20, a collective foyer device 30, and a building control unit 40 in each of the dwelling building A to the dwelling building E. In FIG. 1 of the example, the respective configurations are shown only for the dwelling building A.

The dwelling buildings are respectively interconnected via a network N (in the example, LAN (Local Area. Network)) configured to perform communication in accordance with a general-purpose protocol. Also, the intercom system 1 includes management centers F, G (an example of the centralized building) having similar configurations, which are connected to each dwelling building via the network N. In the meantime, the number of the management centers may be plural or singular.

The dwelling parent device 10 is installed in each dwelling of the housing complex. The dwelling parent device 10 includes a management office button 101 for calling a management office. Also, the dwelling parent device 10 includes a phone call unit 102 for making a call to a manager, a visitor or the like, a display unit 103 on which a message to a resident, an image of a visitor and the like are to be displayed, and the like. The dwelling parent device 10 is configured to respond to a calling from the collective foyer device 30 and the management office parent device 20, for example. Also, the dwelling parent device 10 is configured to call the management office parent device 20 in the host building, a centralized management office parent device 50 (which will be described later) of the management center and the management office parent device 20 of the other dwelling building (other building), for example. In each dwelling parent device 10, information (for example, dwelling parent device ID (identification)) for specifying the corresponding dwelling parent device is stored. The dwelling parent device 10 is communicatively connected to the building control unit 40 via an intercom line (intercom dedicated line) L1, to the management office parent device 20 via intercom lines L1, L2, and to the collective foyer device 30 via intercom lines L1, L3. In the meantime, the dwelling parent device 10 and the management office parent device 20 may be directly interconnected by the intercom line, without via the building control unit 40. In this case, the dwelling parent device 10 is communicatively connected to the management office parent device 20 without the relay of the building control unit 40.

The management office parent device 20 is installed in the management office of each dwelling building. The management office may be provided plurally or singularly in each dwelling building. The management office parent device 20 includes an operation unit 201 that is to be operated so as to call the dwelling parent device 10, a phone call unit 202 for making a call to a resident, a visitor or the like, a display unit 203 on which a message to a manager, an image of a visitor and the like are to be displayed, and the like. The management office parent device 20 is configured to call any dwelling parent device 10 in the host building, for example. Also, the management office parent device 20 is configured to make a call to a resident at the dwelling parent device 10 or a visitor at the collective foyer device 30, for example. The management office parent device 20 is communicatively connected to the building control unit 40 via the intercom line L2 and to the collective foyer device 30 via the intercom lines L2, L3.

The collective foyer device 30 is installed in a collective foyer or a shared space of each dwelling building. The collective foyer device 30 includes a calling unit 301, a camera 302, a collective foyer display unit 303, a phone call unit 304, and the like. The collective foyer device 30 is configured to call any dwelling parent device 10 in the host building or the management office parent device 20 in the host building, for example. The collective foyer device 30 is communicatively connected to the building control unit 40 via the intercom line L3. In the meantime, the collective foyer device 30 may also be directly connected to the dwelling parent device 10 and the management office parent device 20 via the intercom lines, without via the building control unit 40.

The building control unit 40 is configured to control communications among the dwelling parent device 10, the management office parent device 20 and the collective foyer device 30, which are connected via the intercom lines L1 to L3. Also, the building control unit 40 is communicatively connected to the building control units 40 of the other dwelling building (the dwelling building B to the dwelling building E, in the example) and centralized control units 70 (which will be described later) of the respective management centers (here, the management centers F, G), via the network N. Also, the building control unit 40 can be communicatively connected to an external device 80 (for example, PC (Personal Computer) and the like) by way of wireless communication (for example NFC (Near Field Communication), Bluetooth (registered trademark) and the like). Alternatively, the building control unit 40 can be communicatively connected to the external device 80 via the network N.

Each of the management centers F, G is configured to manage the whole housing complex from the dwelling building A to the dwelling building E. Each of the management centers F, G is provided with a centralized management office parent device 50, a centralized collective foyer device 60, and a centralized control unit 70. In FIG. 1 of the example, the respective configurations are shown only for the management center F.

The centralized management office parent device 50 is installed in a management office of the management center F. The management office may be provided plurally or singularly for the management center F. The centralized management office parent device 50 includes an operation unit 501 that is to be operated so as to call the dwelling parent device 10, a phone call unit 502 for making a call to a resident, a visitor or the like, a display unit 503 on which a message to a manager, a video of a visitor and the like are to be displayed, and the like. The centralized management office parent device 50 is configured to call the dwelling parent device 10 of each dwelling building, for example. Also, the centralized management office parent device 50 is configured to make a call to a resident at the dwelling parent device 10 and a visitor at the centralized collective foyer device 60, for example. The centralized management office parent device 50 is communicatively connected to the centralized control unit 70 via an intercom line L4 and to the centralized collective foyer device 60 via intercom lines L4, L5.

The centralized collective foyer device 60 is installed in a foyer of the management center F. The centralized collective foyer device 60 includes a calling unit 601, a display unit 602, a camera 603, a phone call unit 604, and the like. the centralized collective foyer device 60 is configured to call any dwelling parent device 10 of each dwelling building and the centralized management office parent device 50 of the management center F, for example. The centralized collective foyer device 60 is communicatively connected to the centralized control unit 70 via the intercom line L5.

The centralized control unit 70 is configured to control communication between the centralized management office parent device 50 and the centralized collective foyer device 60, which are connected via the intercom line, for example. Also, the centralized control unit 70 is communicatively connected to each building control unit 40 of the dwelling building A to the dwelling building E and to the centralized control unit 70 of the other management center (for example, the management center G), via the network N.

Figure 2A:
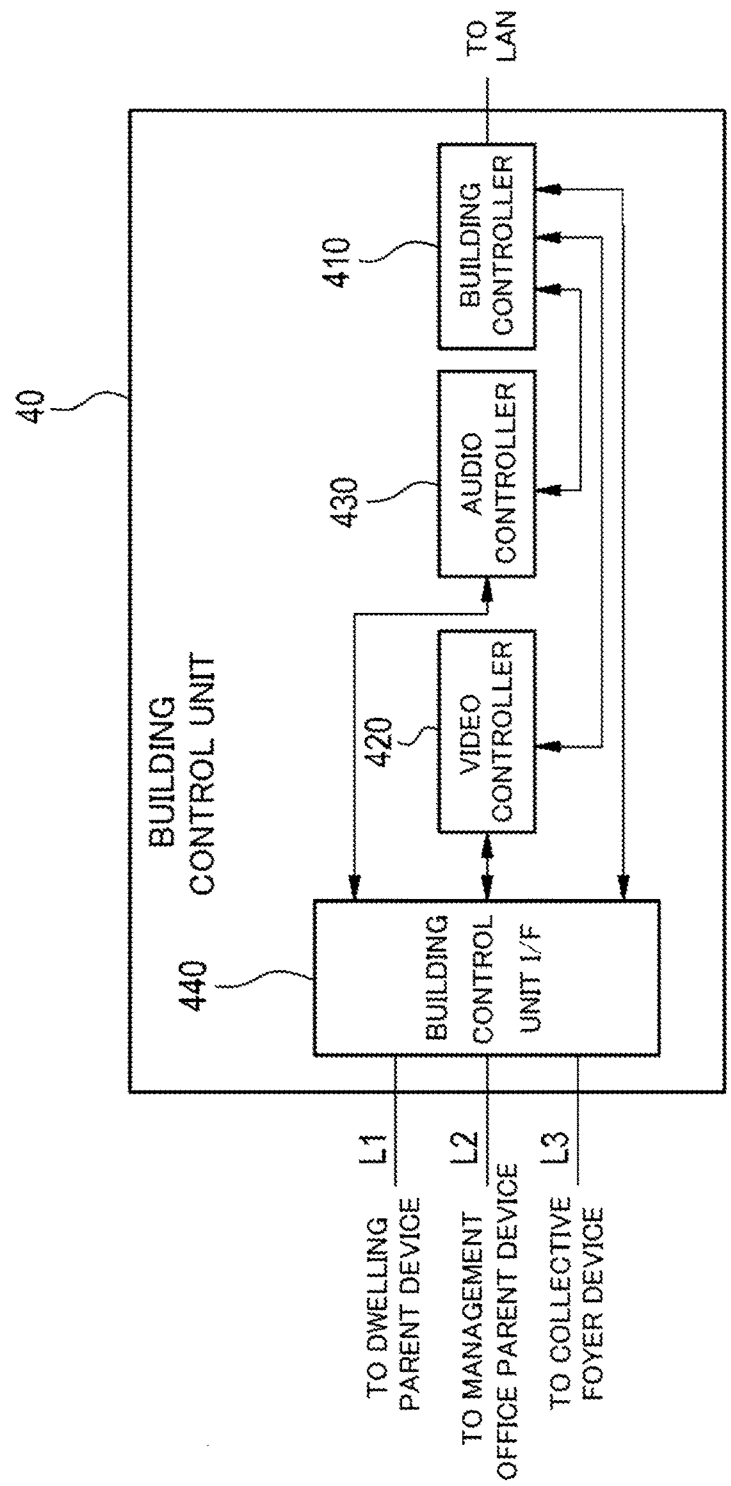
FIG. 2A is a functional block diagram of a building control unit.
Figure 2B:
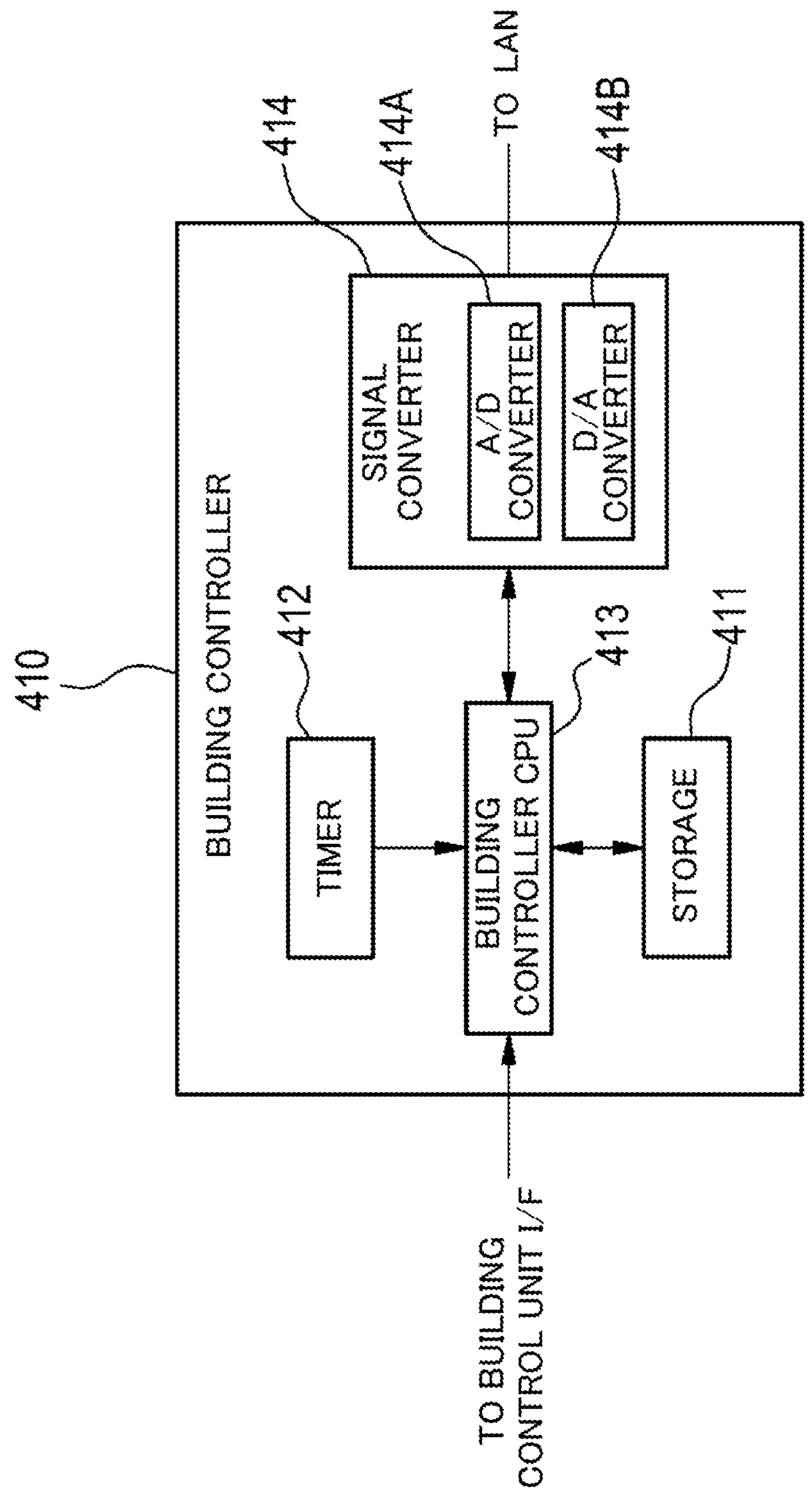
FIG. 2B is a functional block diagram of a building controller.

As shown in FIG. 2A, the building control unit 40 includes a building controller 410, a video controller 420, an audio controller 430, and a building control unit interface 440 (hereinafter, the interface is referred to as 'I/F'). Also, as shown in FIG. 2B, the building controller 410 includes a storage 411, a timer 412, a building controller CPU 413, and a signal converter 414.

In the storage 411 of the building controller 410, a management table (not shown) is stored in which a room number of each dwelling in the host building, a name of a resident of each dwelling or a name of each dwelling (for example, a tenant name or the like), and a dwelling parent device ID for specifying the dwelling parent device 10 of each dwelling are associated each other. Also, in the storage 411, a calling table (for example, a calling table TA of the dwelling building A to be described later with reference to FIG. 3) is stored in which the dwelling parent device 10 in the host building and the centralized management office parent device 50 of the management center or the management office parent device 20 of the other dwelling building, which can be called from the dwelling parent device 10 in the host building, are associated each other.

The timer 412 is configured to measure current time (xx hour xx minute xx second).

The building controller CPU 413 is configured to execute processing for controlling the respective units of the building controller 410. The building controller CPU 413 is configured to determine a transmission destination of a management office calling signal, based on the management office calling signal for calling the management office transmitted from the dwelling parent device 10 in the host building and the calling table TA stored in the storage 411, for example. Also, the building controller CPU 413 is configured to store, in the storage 411, the management table and the calling table TA acquired from the external device 80, for example.

The signal converter 414 is a circuit for interconverting a signal, which is to be used for the intercom lines L1 to L3, and a signal that is to be used for the network N. The signal converter 414 includes an analog to digital converter 414A (hereinafter, analog to digital is referred to as 'A/D') and a digital to analog converter 414B (hereinafter, digital to analog is referred to as 'D/A').

The A/D converter 414A is configured to convert an analog signal, which can be communicated via the intercom lines L1 to L3 in each dwelling building, into a digital signal, which can be communicated via the network N between the respective dwelling buildings and between the dwelling building and the management center. In the meantime, the D/A converter 414B is configured to convert a digital signal, which can be communicated via the network N between the respective dwelling buildings and between the dwelling building and the management center, into an analog signal, which can be communicated via the intercom lines in each dwelling building.

The video controller 420 is configured to execute signal processing for video signals captured with the camera 302 of the collective foyer device 30 and video signals transmitted from the management center, and to transmit the processed video signals toward the dwelling parent device 10 or the management office parent device 20 in the host building. The audio controller 430 is configured to execute voice processing for voice signals transmitted from the phone call unit 304 of the collective foyer device 30, voice signals transmitted from the phone call unit 202 of the management office parent device 20, and voice signals transmitted from the management center, and to transmit the processed voice signals toward the dwelling parent device 10 or the management office parent device 20 in the host building.

The building control unit I/F 440 is configured to form a bidirectional signal transmission path between the building controller 410, video controller 420 and audio controller 430 and the intercom lines L1 to L3.

Although not shown, the management office parent device 20 also has a storage in which the management table and the calling table are stored, like the building control unit 40. Also, the centralized control unit 70 of the management center includes a signal converter (the A/D converter and the D/A converter), and is configured to interconvert an analog signal, which can be communicated via the intercom lines L4, L5, and a digital signal, which can be communicated via the network N, like the building control unit 40.

Subsequently, the calling table is described with reference to FIGS. 3 and 4.

In the calling table, the dwelling parent device 10 and the management office parent device, which can be called from the dwelling parent device 10, are associated with each other, as follows.

For example, in the calling table TA of the dwelling building A shown in FIG. 3, when the "management office button" 101 is pushed at the dwelling parent device 10 in the host building, the centralized management office parent devices 50 of the management centers F, G and the management office parent devices 20 of the other dwelling buildings (the dwelling building B to the dwelling building E) are called in a plurality of calling time zones indicated by "calling time 1" and "calling time 2", in addition to the management office parent device 20 in the host building.

The calling table is configured so that the calling time zone, in which the centralized management office parent device 50 of the management center and the management office parent device 20 of the other dwelling building are to be called, can be preset. In the example, the calling time zone of the calling table TA includes the calling time 1 set to 17:00 to 09:00 and the calling time 2 set to 12:00 to 13:00.

Also, the calling table is configured so that the centralized management office parent device 50 and the management office parent device 20 of the other dwelling building, which are to be called in addition to the management office parent device 20 in the host building, can be preset for each of the calling time 1 and the calling time 2. In the calling table TA of the example, the management office parent device that is to be called in the calling time 1 is set to the centralized management office parent devices 50 of the management centers F, G and the management office parent device 20 of the dwelling building B. Also, the management office parent device that is to be called in the calling time 2 is set to the centralized management office parent device 50 of the management center F and the management office parent devices 20 of the dwelling building B to the dwelling building D. That is, like the setting example 1 shown in FIG. 4, the calling table TA is set so that when there is a calling of the management office parent device 20 from the dwelling parent device 10 of the dwelling building A in the night-time zone (17:00 to 09:00), the centralized management office parent device 50 of the management center F, the centralized management office parent device 50 of the management center G and the management office parent device 20 of the dwelling building B are called, in addition to the management office parent device 20 of the dwelling building A. Also, the calling table is set so that when there is a calling in the lunch time (12:00 to 13:00), the centralized management office parent device 50 of the management center F and the management office parent devices 20 of the dwelling building B to the dwelling building D are called, in addition to the management office parent device 20 of the dwelling building A.

In the meantime, when a plurality of the centralized management office parent devices 5 is installed in each of the management centers F, G or when the plurality of management office parent devices 20 is set in each of the dwelling building B to the dwelling building E, the presence or absence of the calling may be set for each of the centralized management office parent devices 50 or for each of the management office parent devices 20.

Figure 4:
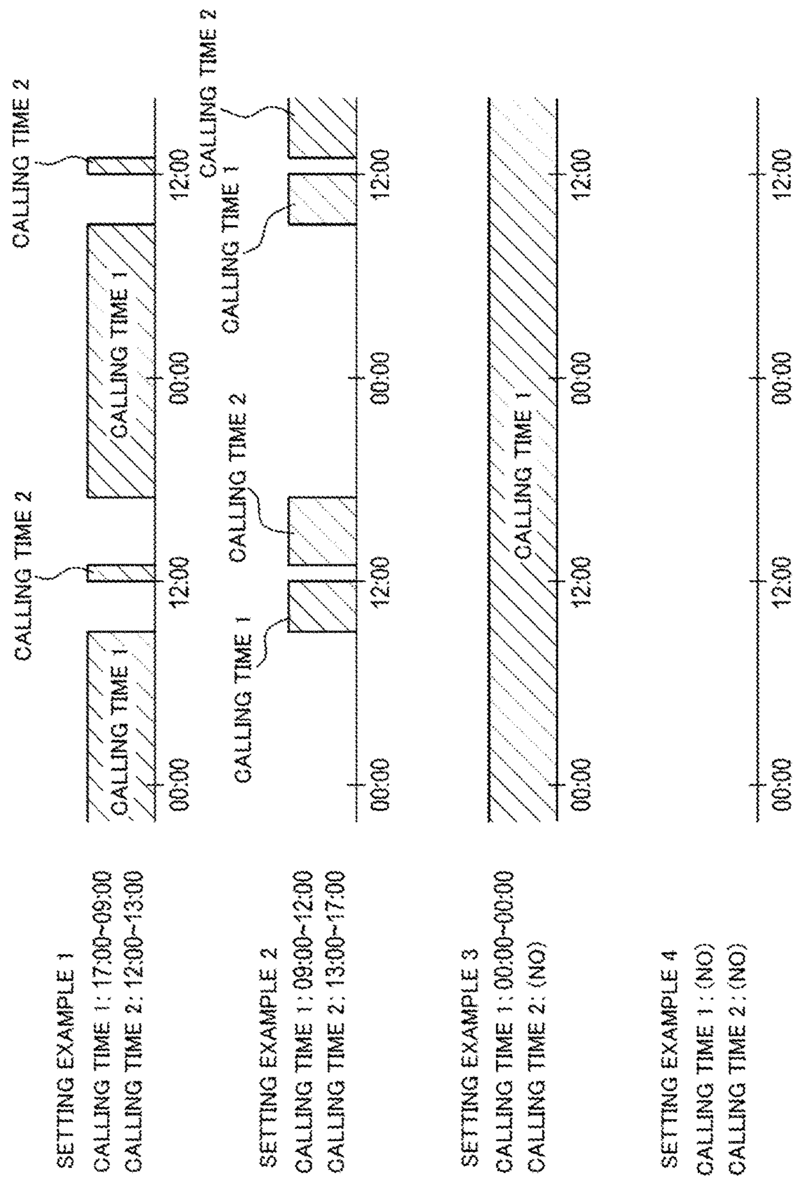
FIG. 4 depicts a setting example of a calling time zone in which it is possible to call a management office parent device.

The calling time zone may also be set to a setting example 2 to a setting example 4 of FIG. 4, in addition to the calling time 1 and calling time 2 set in the setting example 1 shown in FIGS. 3 and 4. In the setting example 2, the calling time 1 is set to 09:00 to 12:00, and the calling time 2 is set to 13:00 to 17:00. That is, the setting example 2 is set so that when there is a calling of the management office from A.M. 09:00 to P.M. 05:00 except the lunch time (12:00 to 13:00), the centralized management office parent device 50 and the management office parent device 20 of the other dwelling building are also to be called. In the setting example 3, the calling time 1 is set to 00:00 to 00:00, and the calling time 2 is not set. That is, the setting example 3 is set so that when there is a calling of the management office, the centralized management office parent device 50 and the management office parent device 20 of the other dwelling building are also to be always called. In the setting example 4, neither the calling time 1 nor the calling time 2 is set. That is, the setting example 4 is set so that even when there is a calling of the management office, the centralized management office parent device 50 and the management office parent devices 20 of the other dwelling buildings are not to be called.

In the meantime, the calling time zone is not limited to the "calling time 1" and "calling time 2", and may be added depending on whether the management office in each dwelling building is to respond or not. Also, only one calling time zone may be set. Also, the calling table configured as described above is set for each dwelling building, and is stored in the storage 411 of each building control unit 40.

Each data of the calling table is configured so that the setting thereof can be changed with the external device 80 (an example of the setting unit) capable of performing communication with the building controller CPU 413 of the building control unit 40. As the setting unit, the building control unit 40 may be provided with a setting operation unit, for example, in addition to the external device 80. For example, when making the setting by using the external device 80, the calling table may be set with the external device 80, in accordance with a setting tool, the external device 80 and the building control unit 40 may be interconnected by wireless communication, and the calling table may be transmitted from the external device 80 to the building control unit 40. Also, the set calling table of each dwelling building may be transmitted from the building control unit 40 of the dwelling building connected to the external device 80 to the building control unit 40 of the other dwelling building via the network N.

Figure 5:
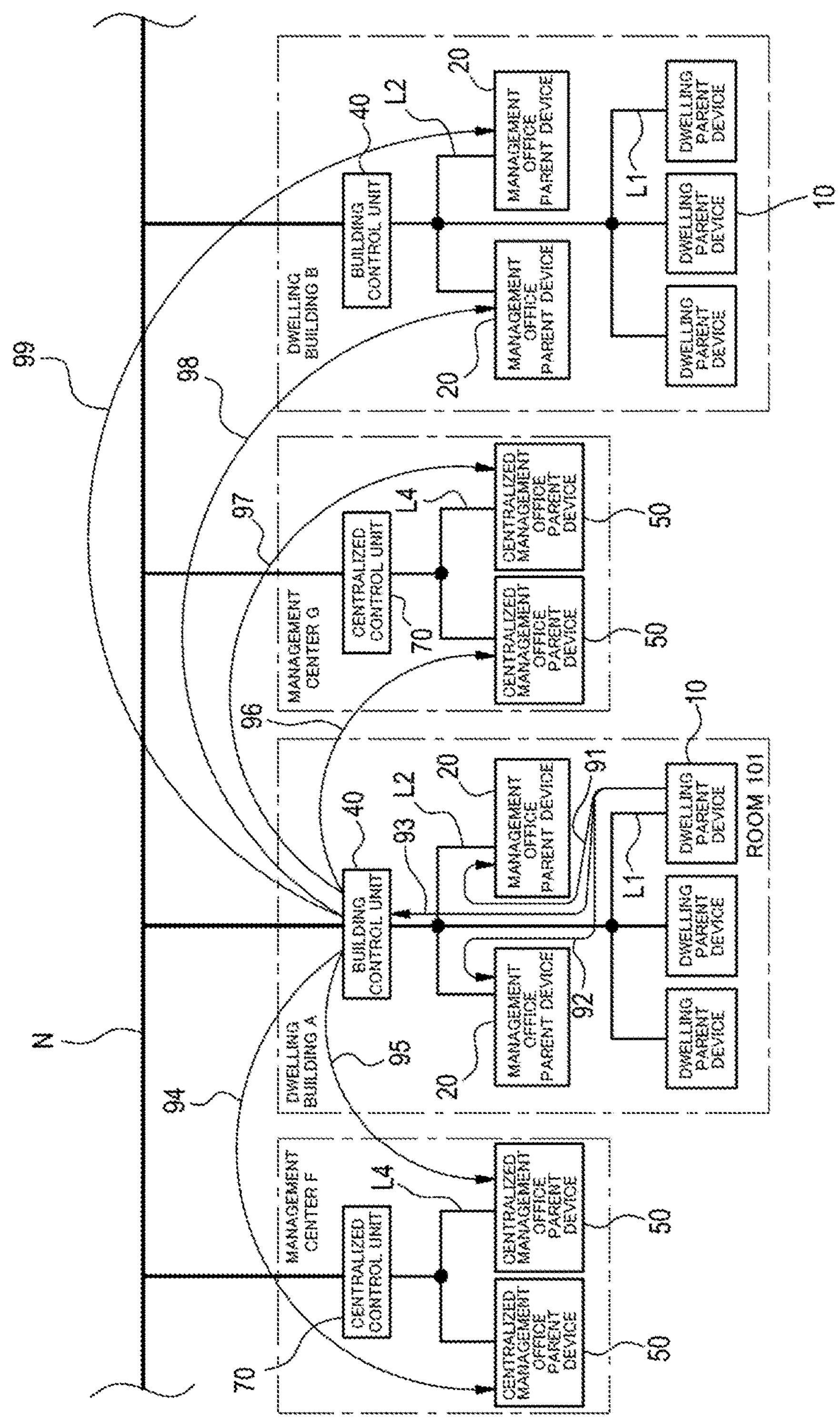
FIG. 5 illustrates a flow of a management office calling signal.

Subsequently, operations of the intercom system 1 are described with reference to FIG. 5.

For example, when "the management office button" 101 (refer to FIG. 1) is pushed at the dwelling parent device 10 in a room 101 of the dwelling building A, following operations are performed. In FIG. 5, the dwelling parent device 10 and the management office parent device 20 in the dwelling building A are directly connected via the intercom line, without via the building control unit 40.

When the management office button 101 is pushed, a management office calling signal for calling the management office and a dwelling parent device ID for specifying the dwelling parent device 10 in the room 101 are transmitted from the dwelling parent device 10 in the room 101 to the management office parent device 20 in the dwelling building A and the building control unit 40 in the dwelling building A via the intercom lines, as shown with the arrows 91 to 93.

The management office parent device 20 of the dwelling building A directly (i.e., without via the building control unit 40) receives the management office calling signal and the dwelling parent device ID from the dwelling parent device 10. When the management office calling signal and the dwelling parent device ID are received, the management office parent device 20 determines whether the management office is called from the dwelling parent device 10, based on the calling table stored therein. Then, the management office parent device 20 generates a calling sound and displays and notifies the display unit 203 that a calling source is the room 101, for example.

When the management office calling signal and the dwelling parent device ID are received, the building control unit 40 of the dwelling building A determines whether the current time is within the preset calling time zone, based on the calling table TA (refer to FIG. 3). When the current time is within the calling time 1 (17:00 to 09:00), for example, the building control unit 40 determines a transmission destination of the management office calling signal and the dwelling parent device ID, based on the calling table TA. Then, the building control unit 40 transmits the management office calling signal and the dwelling parent device ID towards the centralized management office parent devices 50 of the management centers F, G and the management office parent device 20 of the dwelling building B, which are the determined transmission destinations, via the network N, as shown with the arrows 94 to 99.

The centralized control units 70 of the management centers F, G transmit the management office calling signal and the dwelling parent device ID, which have been transmitted from the building control unit 40 of the dwelling building A, to the centralized management office parent devices 50 in the host management centers. When the management office calling signal and the dwelling parent device ID are received, the centralized management office parent device 50 generates a calling sound for notification.

The building control unit 40 of the dwelling building B transmits the management office calling signal and the dwelling parent device ID, which have been transmitted from the building control unit 40 of the dwelling building A, to the management office parent device 20 in the host building. When the management office calling signal and the dwelling parent device ID are received, the management office parent device 20 of the dwelling building B generates a calling sound for notification.

Also, when the current time is within the calling time 2 (12:00 to 13:00), for example, the building control unit 40 determines a transmission destination on the basis of the calling table TA, as described above, and transmits the management office calling signal and the dwelling parent device ID toward the centralized management office parent device 50 of the management center F and the management office parent devices 20 of the dwelling building B to the dwelling building D, which are the transmission destinations, via the network N.

The operations in the management center F and the dwelling building B to the dwelling building D to be performed thereafter are similar to those in the management centers F, G and the dwelling building B.

According to the intercom system 1, when there is a time zone in which it is not possible to respond to the management office calling from the dwelling parent device 10 with the management office parent device 20 in the host building, it is possible to call the centralized management office parent device 50 in the management center or the management office parent device 20 in the other dwelling building (other building) in the time zone. Therefore, even when a situation where it is not possible to respond to the calling with the management office parent device 20 in the host building, it is possible to securely respond to the calling at the other management office.

Also, the calling time zone for calling the centralized management office parent device 50 or the management office parent device 20 of the other dwelling building can be set in plural for each calling time zone. Therefore, it is possible to prepare a variety of calling patterns (for example, the setting examples 1 to 4, in FIG. 4) by a combination of the different calling time zones, in correspondence to a situation of each dwelling building.

Also, the building control unit 40 of each dwelling building stores therein the calling table (for example, the calling table TA in FIG. 3) for calling the centralized management office parent device 50 or the management office parent device 20 of the other building from the dwelling parent device 10 in the host building. Therefore, since it is possible to dispersedly control the whole system at each building control unit 40, it is possible to lower a processing capacity necessary for the centralized control units 70 of the management centers F, G, so that it is possible to suppress an increase in cost.

Also, it is possible to set the calling table in the host building and to set the calling table of the other dwelling building connected via the network N by the external device 80 communicatively connected to the building control unit 40 of the specific dwelling building, for example. Therefore, it is possible to easily change the setting of the calling table in a short time, so that it is possible to largely improve the operation efficiency.

In the meantime, the present invention is not limited to the illustrative embodiment, and can be appropriately modified and improved. In addition, the materials, shapes, dimensions, numerical values, forms, number, arrangement places and the like of the respective constitutional elements of the illustrative embodiment are arbitrary and are not particularly limited inasmuch as the present invention can be implemented.

For example, in the illustrative embodiment, the dwelling parent device 10 is configured to call the management office parent device 20. However, the present invention is not limited thereto. For example, even when the collective foyer device 30 calls the management office parent device 20 and the centralized collective foyer device 60 calls the centralized management office parent device 50, it is possible to dividually call the management office parent device, in correspondence to the calling time zone set in a similar manner.

DESCRIPTION OF REFERENCE NUMERALS

1: intercom system, 10: dwelling parent device, 20: management office parent device, 30: collective foyer device, 40: building control unit, 50: centralized management office parent device, 60: centralized collective foyer device, 70: centralized control unit, 80: external device (example of setting unit), 101: management office button, 102: phone call unit, 103: display unit, 201: operation unit, 202: phone call unit, 203: display unit, 410: building controller, 411: storage, 412: timer, 413: building controller CPU, 414: signal converter

The invention claimed is:

1. An intercom system to be used in a housing complex constituted by a plurality of dwelling buildings, wherein each of the dwelling buildings comprises:

a dwelling parent device installed in each dwelling, a management office parent device in a host building communicatively connected to the dwelling parent device via an intercom line and capable of responding to a calling from the dwelling parent device, and a building control unit communicatively connected to the dwelling parent device of each dwelling in the host building and the management office parent device in the host building via the intercom line, wherein the building control units of the plurality of dwelling buildings are interconnected via a network on which communication is to be performed in accordance with a general-purpose protocol, wherein the network is further connected with a centralized building, and the centralized building comprises a centralized management office parent device capable of making a phone call to the dwelling parent device in each dwelling of the plurality of dwelling buildings, and a centralized control unit communicatively connected to the centralized management office parent device via the intercom line, wherein the building control unit in each dwelling building can set a specific calling time zone in which it is possible to call the centralized management office parent device or the management office parent device of other building, in addition to the management office parent device in the host building, and wherein when there is a calling from the dwelling parent device in the set calling time zone, the management office parent device in the host building receives a calling signal from the dwelling parent device and the building control unit also receives the calling signal from the dwelling parent device and transmits the calling signal to the centralized management office parent device or the management office parent device of the other building.

2. The intercom system according to claim 1, wherein each building control unit comprises a storage in which a calling table, in which each dwelling parent device in the host building and at least one centralized management office parent device or management office parent device of the other building capable of being called from the corresponding dwelling parent device are associated with each other, is stored, and wherein a setting of the calling table is changed by a setting unit capable of performing communication with each building control unit.

3. The intercom system according to claim 2, wherein the calling time zone can be set in plural in the calling table.

4. The intercom system according to claim 2, wherein the calling table stored in the building control unit of the other building can be set over the network by the setting unit communicatively connected to the building control unit in the host building.

* * * * *